United States Patent [19]

Babcock

[11] 3,938,768

[45] Feb. 17, 1976

[54] BARREL HANDLER
[76] Inventor: Don L. Babcock, Box 62, Utica, Kans. 67584
[22] Filed: June 24, 1974
[21] Appl. No.: 482,794

[52] U.S. Cl................ 248/129; 280/47.12; D12/25
[51] Int. Cl.² .......................................... B62B 3/08
[58] Field of Search................ 280/47.12; 214/372; 248/129, 139, 140, 141, 142; D12/25

[56] References Cited
UNITED STATES PATENTS

| | | | |
|---|---|---|---|
| 372,976 | 11/1887 | Heilman.......................... | 214/372 X |
| 430,562 | 6/1890 | Berry................................ | 248/129 |
| 489,745 | 1/1893 | Juvinall........................... | 248/129 X |
| 586,638 | 7/1897 | Swart............................... | 248/140 X |
| 1,202,507 | 10/1916 | Glidden........................... | 280/47.12 |
| 1,403,023 | 1/1922 | Fouts................................ | 248/129 |
| 1,534,346 | 4/1925 | White.............................. | 280/47.12 |

FOREIGN PATENTS OR APPLICATIONS

| | | | |
|---|---|---|---|
| 845,573 | 6/1970 | Canada............................. | 248/140 |
| 188,560 | 7/1906 | Germany.......................... | 248/140 |
| 91,884 | 6/1959 | Netherlands..................... | 280/47.12 |

Primary Examiner—M. H. Wood, Jr.
Assistant Examiner—John A. Pekar
Attorney, Agent, or Firm—George R. Douglas, Jr.; Sherman Levy; Anthony D. Cennamo

[57] ABSTRACT

A barrel handler formed of a two pieced rack for loading, unloading and transporting barrels and like elements comprising a pair of box tubing forming a base frame, a pair of upstanding box tubing elements having a common end centrally disposed and supported from the base frame, a pair of support box tubing forming a supporting frame connected between extremeties of the base frame and the support frame, a movable barrel receiving frame means pivotally disposed and mounted from the free end of the upstanding pair of box tubing elements, and space-rest support means for the barrel receiving frame means disposed in relative relation to the base frame. The invention also includes handle grip means mounted on ends of the barrel receiving frame means, wheel roller disposed on the common end of the base frame, and wheel casters being mounted from the base frame remote from the wheel rollers.

8 Claims, 5 Drawing Figures

BARREL HANDLER

CROSS REFERENCES TO RELATED INFORMATION AND REFERENCES

The present invention is a substantial improvement, departure and modified arrangement over prior art designs, constructions and features that relate to barrel rack supports, such as:

| | |
|---|---|
| Milton | 2,180,641 |
| Falls | 1,467,719 |
| Ulvig | 1,214,617 |
| Caylor | 2,910,304 |
| Williams | 2,477,278 |
| Cadwalad | 1,510,456 |
| Pihan | D-202,913 |
| Fleischman | 3,052,441 |

It is noted that the present invention has a pivotal element supported from the free end of an upstanding pair of box tubing elements supported from a base frame, and in which the base frame may be either movable such as by wheel means or supported from skid type elements.

BRIEF SUMMARY OF THE INVENTION

The present invention relates to an improvement in barrel handler arrangements forming a two piece rack for loading, unloading and transporting barrels and similar type elements such as heavy cast iron welding bottles, gas drums, or petroleum barrels, and the like. More particularly the invention relates to barrel handlers and the like, as described above, for loading, unloading and transporting thereof, in which the device is constructed of a pair of box tubing elements forming a base frame, a pair of upstanding pair of box tubing elements having a common end centrally disposed of and secured to the base frame, a pair of structurally supporting box tubing elements forming a supporting frame and connected between extremeties of said base frame in said support frame, a movable barrel receiving frame means pivotally disposed and mounted on the free end of said upstanding pair of box tubing, and space-resting means to spacially dispose and support for resting barrel receiving frame means in relative relation to the base frame. Furthermore, the invention relates to constructing a barrel handler apparatus essentially from box tubing. Also the invention relates to providing a pair of wheel rollers at one end of the base frame and a pair of handle grip means mounted on the barrel receiving frame means and providing wheel casters at the same end of the base frame.

FIELD OF THE INVENTION

The present invention provides features of a barrel supporting rack that are unique so that there is provided means to tip up and down a 30-gallon drum by using ball bearing elements in the movable carrier and establishing a pivot point on the drum. The device can be constructed of both elements of box frame or tubing elements and may be bolted together after having been packaged and shipped in cartons in knock-down kits.

The units having wheels in front and caster wheels behind may be used in school systems where rubber tired elements for reduction in noise are required. When the barrel is in the down position, it can be pushed easily to wherever one is working. Schools, and other institutions, receive chemicals and wax products in barrels so there is a large use for the barrel rack of the present invention. In such institutions it is often found that a chair or small table means is used to tip over a barrel for dispensing the fluid in the barrel but by use of the rack of the present invention, ease, mobility and other advantages are readily apparent.

BACKGROUND OF THE INVENTION

It is an object, advantage and feature of the present invention to provide a rack without wheels or other movable means so that there is provided ease in tilting or moving 55-gallon barrels or the like so that they may be tipped up and back again with a rocker element that is found to have advantage over much of the prior art.

A further object and feature of the present invention is to provide movable means such as wheels in front and caster wheels behind that can be used in institutional use so that when the barrel is in the down position, it can be pushed easily to wherever one is working. Such institutions get their wax and chemicals in barrels, and there is advantages seen in the present invention in moving the barrel handler forming a two-piece rack that is supported by a pivot and ball bearing means for use to the best advantage as seen in the present invention.

It is a further and advantageous object of the present invention to provide means and use of the apparatus for carrying sacks, heavy cast iron welding bottles, for transport about a given locale. In the up position, the device of the invention sheds rain water and is thus not readily a collector of stagnant water.

Within the purview of the present invention, a chain may be used at the rear to stabilize the barrel in place. To prevent small children from tipping the rack back and causing an accident, a chain may be used in front for safety purposes. A further object of the present invention is to provide a series of roller elements that can be attached to movable rack in a series of parallel arrangements so that the rack may be disposed on a level arrangement and provide for means rolling a cast iron welding bottle or tank, or petroleum barrel, in a longitudinal direction as may be desired.

It is a project and advantage of the present invention to provide a two-piece frame unit which are interconnected by a rod and ball bearing interfacing elements so that a solid frame and a movable rack are provided with ease for handling heavy barrels and the like.

A further object of the present invention is to provide a frame on which are mounted ball bearingly supported wheels with puncture proof semi-pneumatic tires with heavy steel discs. Swivel casters with one row of hardened steel ball bearings, caster horn and ball bearing raceway are also provided. Wheels are of hard rubber composition with cushion tread for use in institutions, schools, factories and other general use.

A further object of the invention is to provide for loading and unloading of barrel element with ease in a matter of seconds.

A further object of the present invention is to provide a skid support element for a drum, or the like, that is provided with an auxiliary handle that makes tipping a 55-gallon drum easy.

BRIEF DESCRIPTION OF THE SEVERAL VIEWS OF THE DRAWINGS

The above and other objects and advantages of the invention will become apparent upon full consideration of the following detailed description and accompanying drawings in which.

DETAILED DESCRIPTION OF PREFERRED EMBODIMENTS OF THE INVENTION

Figure 1:
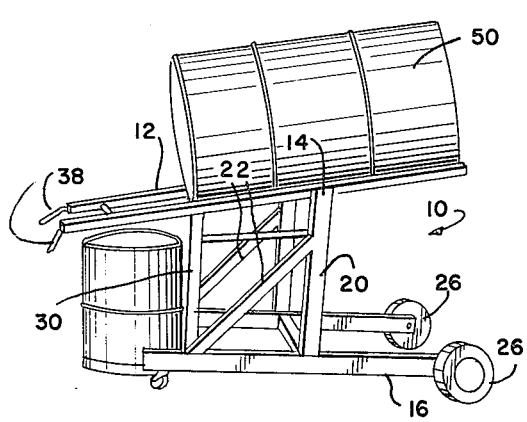
FIG. 1 is a generally front perspective view of a barrel handler in accordance with a preferred embodiment of the present invention and having a barrel in the generally horizontal position.

Referring now to the drawings, there is shown a barrel handler 10 formed of a two piece rack 12 shown pivotally mounted by pivot means 14 to a base frame 16 by means of an intermediate upstanding pair of box tubing 20. The pivot means 14 may comprise a shaft or tubular member supported by means of ball bearings within the box tubing 20 and for providing pivotal motion to the barrel receiving frame means 12.

The frame members 12, 16 may well be constructed of box tubing as shown.

Figure 2:
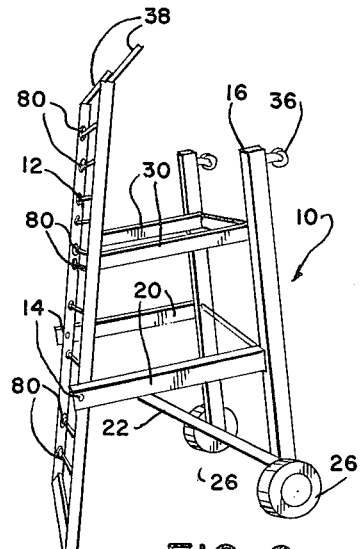
FIG. 2 is a similarly disposed front perspective view of the invention without the barrel and disposed in the generally vertical arrangement.
Figure 3:
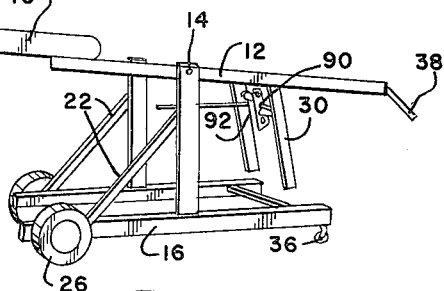
FIG. 3 is a modification of the barrel handler having an end extension thereon in accordance with a further embodiment of the present invention.

A pair of support box tubing elements forming a support frame 22 is shown connected between the pivot end of the upstanding box tubing 20 and the distal end of the base frame 16, at which there is also mounted a pair of wheel rollers 26, 26. Also shown in FIGS. 1 and 2 is a space-support structure 30 provides space and rest functions in supporting the barrel receiving frame means 12 in relative relation to the base frame 16. FIG. 3 shows the space-rest means 30 supported from the barrel frame means 12 and when in the lowered position, the space-rest means rests against the base frame 16.

While one end of the base frame 16 is provided with wheels 26,26, the other end may be provided with wheel casters 36. To this same end of the barrel handler 10, there may be provided handle grip means 38 for lifting or lowering the barrel receiving frame means 12.

Figure 5:
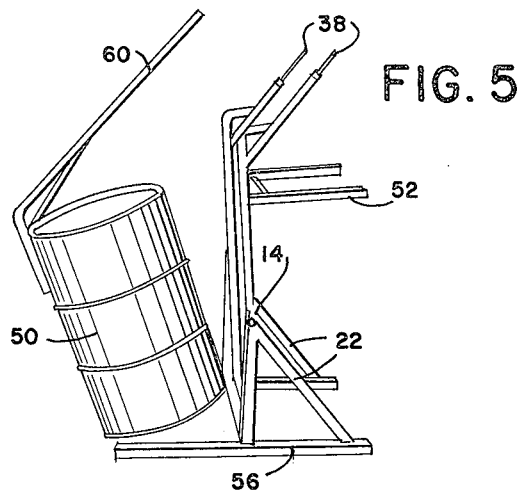
FIG. 5 is a generally front perspective view of a modification of the present invention in which there is provided an auxiliary handle useful for tipping a large gallon drum with facilities so that it is disposed onto the barrel receiving frame and may then be tipped over into place for use or storage within the purview of the present invention.

FIG. 3 shows an embodiment in which there is provided at the distal end of the barrel receiving frame means 12 an extension 40 which is attached onto the barrel receiving frame 12 by conventional means such as bolts, or the like, and having a pivotal member 42 connected therewith and having a chain coupled limit means 44 to limit the angle through which the pivotal member 42 may extend, such as at a maximum of 90°. In FIG. 5 the base frame and the barrel receiving frame are essentially coplanar or integrally connected and constructed with each other so that it receives the barrel 50 and is supported by legs 52, 56, and the latter legs being supported by support means 22 mentioned above. FIG. 5 shows the arrangement having skid surfaces at the lower extremeties of the legs 52, 56, and which there are handles 38, as described above.

Figure 4:
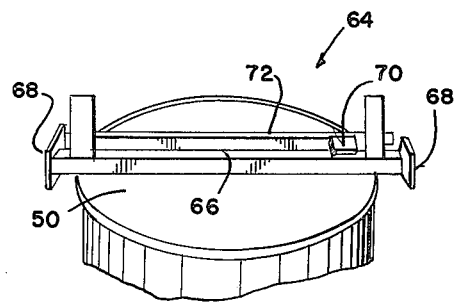
FIG. 4 is a generally perspective view of a leg lock mechanism for locking up to one piece of shafting and having a float pedal to release the latches that are welded on each end.

FIG. 5 also shows means such as an auxiliary handle 60 that assists and aids in the tipping of the 55-gallon drum element 50 as is shown therein. FIG. 5 also shows the pivot element 14 constructed of the ball bearing interconnections as described above in connection with FIGS. 1 and 2. FIG. 4 is a view of the leg lock mechanism according to another embodiment of the invention, and in which the barrel 50 is disposed to show the leg lock mechanism 64 which is provided with a one piece of shafting 66 having a bearing 68, 68 on each end. A float pedal 70 releases the latches that are welded on each end by means of a spring 72 disposed on one side for holding the latches in place. The latches are built on an angle to keep them from folding, and a small piece of flat portion of the latch is welded to the legs as shown. Further illustrated in FIG. 2, there is shown a series of rollers 80 that can be attached to the movable rack 12 so that the rack can be on the level and held parallel to the floor of a pickup truck, for example, so that in this way heavy loads can be loaded onto the truck with a great deal of facility by the barrel or other objects being slid along the rollers of the movable back while held in the horizontal position. The rollers can be used to unload groceries and similar to the racks otherwise known and used for unloading groceries along a movable track.

A plate 90 is shown used for holding the barrel in place, and is provided with various holes drilled along its center line and is moved in various positions and tightened in place with wing nut 92.

It is seen therefore that by the construction and use of the present invention there is a barrel handler apparatus formed of a two piece rack for loading, unloading and transporting barrels, and the like in accordance with the objects and advantages of the present invention.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

What is claimed is:

1. A barrel handler forming a two-piece rack for loading, unloading and transporting barrels and the like comprising a pair of box tubing forming a base frame having a central frame forming with said box tubing a U-shaped recesses at each of the ends thereof, a pair of upstanding pair of box tubing having its lower end disposed centrally of and secured to said base frame, a pair of support box tubing forming a support frame and connected between extremities of said base frame and said support frame, a movable barrel receiving frame means pivotally disposed and mounted on the free end of said upstanding pair of box tubing, and space-rest means to support the barrel receiving frame means in relative relation to the base frame, said space-rest means being constructed of box tubing and mounted in up-standing relation adjacent one of said U-shaped recesses, said base frame having a pair of wheel rollers at an end of said base frame, and a pair of handle grip means mounted on the end of said barrel receiving frame means distal to said wheel rollers.

2. The invention of claim 1 wherein said barrel receiving frame means is constructed of box tubing.

3. The invention of claim 1 wherein wheel casters are mounted from the base frame.

4. The invention of claim 3 wherein wheel casters are mounted from the base frame remote from the wheel rollers.

5. The invention of claim 1 wherein an extension means is attached onto said barrel receiving frame means and having a pivotal member connected thereto with a chain coupled limit means.

6. The invention of claim 1 wherein said base frame and said barrel receiving frame means are essentially integrally constructed parallel to each other.

7. The invention of claim 1 wherein a series of roller bars are spacially disposed along the length of said movable barrel receiving frame means.

8. A barrel handler forming a two-piece rack for loading, unloading and transporting barrels and the like comprising a pair of box tubing forming a base frame having a central frame forming with said box tubing a U-shaped recesses at each of the ends thereof, a pair of upstanding pair of box tubing having its lower end disposed centrally of and secured to said base frame, a pair of support box tubing forming a support frame and connected between extremities of said base frame and said support frame, a movable barrel receiving frame means pivotally disposed and mounted on the free end of said upstanding pair of box tubing, and space-rest means to support the barrel receiving frame means in relative relation to the base frame, said space-rest means being constructed of box tubing and mounted in upstanding relation adjacent one of said U-shaped recesses and said base frame having a pair of wheel rollers at an end of said base frame and wheel casters mounted from the base frame remote from said wheel rollers.

* * * * *